(12) United States Patent
Zhang et al.

(10) Patent No.: US 9,674,132 B1
(45) Date of Patent: Jun. 6, 2017

(54) SYSTEM, METHODS, AND USER INTERFACE FOR EFFECTIVELY MANAGING MESSAGE COMMUNICATIONS

(71) Applicants: Guangsheng Zhang, Palo Alto, CA (US); Chizhong Zhang, Palo Alto, CA (US)

(72) Inventors: Guangsheng Zhang, Palo Alto, CA (US); Chizhong Zhang, Palo Alto, CA (US)

(*) Notice: Subject to any disclaimer, the term of this patent is extended or adjusted under 35 U.S.C. 154(b) by 529 days.

(21) Appl. No.: 14/188,693

(22) Filed: Feb. 25, 2014

Related U.S. Application Data (60) Provisional application No. 61/809,893, filed on Apr. 9, 2013, provisional application No. 61/805,141, filed on Mar. 25, 2013.

(51) Int. Cl.
| | | |
|---|---|---|
| *G06F 3/00* | (2006.01) | |
| *H04L 12/58* | (2006.01) | |
| *G06F 3/048* | (2013.01) | |

(52) U.S. Cl.
CPC ............. *H04L 51/24* (2013.01); *G06F 3/048* (2013.01)

(58) Field of Classification Search
None
See application file for complete search history.

(56) References Cited

U.S. PATENT DOCUMENTS

| | | | |
|---|---|---|---|
| 8,375,052 B2 | 2/2013 | Bordeaux et al. | |
| 2008/0037721 A1* | 2/2008 | Yao | G06Q 10/107 379/88.11 |
| 2013/0311585 A1 | 11/2013 | Van Quy Tu | |

* cited by examiner

*Primary Examiner* — Jeffrey A Gaffin
*Assistant Examiner* — Ayesha Huertas Torres (57) ABSTRACT

System, methods, and user interface for managing emails and other message communications are disclosed as solutions for reducing confusion and avoiding mistakes in communications when replying to a message with multiple recipients. The mode of replying either to the sender only or to multiple recipients is first detected, and notifications and user interface objects are displayed to help the user to make sure the message is sent to the intended recipient, and to easily correct a mistake and switch the mode of reply for enhanced productivity. The notification can be displayed based on the user actions or based on the results of a text analysis of the content of the message.

20 Claims, 7 Drawing Sheets

SYSTEM, METHODS, AND USER INTERFACE FOR EFFECTIVELY MANAGING MESSAGE COMMUNICATIONS

CROSS REFERENCES AND RELATED APPLICATIONS

The present application claims priority to U.S. Provisional Patent Application 61/805,141 entitled "System, Methods, and User Interface for Presenting Information Based on Document Contents" filed on Mar. 25, 2013, and U.S. Provisional Patent Application 61/809,893 entitled "System, Methods, and User Interface for Automatically Presenting Information Based on Relevance" filed on Apr. 9, 2013, the disclosures of which are incorporated herein by reference.

BACKGROUND OF THE INVENTION

Email is one of the most common forms of communication in today's digital age. Email systems employ various ways to facilitate conversations, and current email systems allow users to quickly respond to messages with a click of a button or a touch on a screen. However, emails, as well as other communication formats, can be sent to either a single recipient or multiple recipients, and the conventional methods used in current email systems can often cause confusions in communications.

When an email is sent to multiple recipients, for example, user A sends an email to user B and user C, in replying to the email, user B may either reply to user A only, or to both user A and user C.

In conventional email systems, a common practice is to provide two separate user interface objects such as two buttons or dropdown menu items, one for replying to the sender only, and the other for replying to all recipients. Such objects are often labeled as "Reply" or "Reply to All". In some systems, only one button is displayed as the default, especially when it is implemented on a mobile device due to limited viewing area, and the default option is often for replying to the sender only.

However, a problem with the conventional approach is that users may not always be aware that the original message is sent to multiple recipients. In such a case, if the user acts on the Reply button either by habit, as most of the emails the user receives are addressed to a single person, or by convenience when only the Reply button is visible, other recipients in the thread may miss an important message from the user. On the other hand, even when both the Reply button and "Reply to All" button are visible or are equally convenient to act on, sometimes the user's reply may contain sensitive or private information intended for only the sender of the original message. In such a case, acting on the "Reply to All" button can have undesired consequences.

Furthermore, there are times when a user needs to forward an email to another person who is not a recipient of the original email. In cases where the email being forwarded is a thread containing previous emails from multiple persons, certain information in the thread, such as other person's name or email addresses, or certain content in the previous emails, may be confidential or private to the original persons in the thread only, or not intended for the person that the email thread is being forwarded to.

More effective solutions to problems like the above are needed.

SUMMARY OF THE INVENTION

The present invention provides system, methods and user interface to overcome the problems in the conventional email systems, specifically to reduce the possibilities of making mistakes in replying to emails, and to avoid confusion in email communications, as well as to provide enhanced productivity.

In a general aspect, the system detects whether an email or other message object is originally addressed to multiple recipients or not. If it is addressed to multiple recipients, the system then detects the mode of reply in terms of whether the user is replying to the sender only, or to multiple recipients including all recipients in the original message. Depending on the mode of reply detected, the system displays notifications to remind the user of the current mode of reply, such that the user can make sure that the reply is addressed to the intended recipients.

In a specific aspect, additional user interface objects are provided for the user to easily switch the mode of reply in case the initial selection is not the intended selection.

In another specific aspect, a notification is attached to the message being sent such that the receiver is aware of who the reply is intended for.

In another specific aspect, whether the notification is displayed is based on the result of a text analysis of the content of the message, and the notification is displayed if the message content contains information about the intended recipients.

System, methods and user interface for managing forwarded messages are also disclosed as a solution for avoiding forwarding message contents to unintended recipients, especially when a message thread contains confidential contents.

DETAILED DESCRIPTION OF THE INVENTION

In the following description, the examples mainly pertain to email messages for illustration purposes. However, the system and methods and user interface of the present disclosure can be applied in the same way to other means of communications that involve text messages sent or received from multiple participants. Such means of communications include online chat, SMS, and other types of communications including various social media communications. Together they can be referred to as text message or text message objects.

The present invention provides solutions to reduce confusion and avoid accidental mistake in electronic communications involving emails to and from multiple participants.

Figure 1:
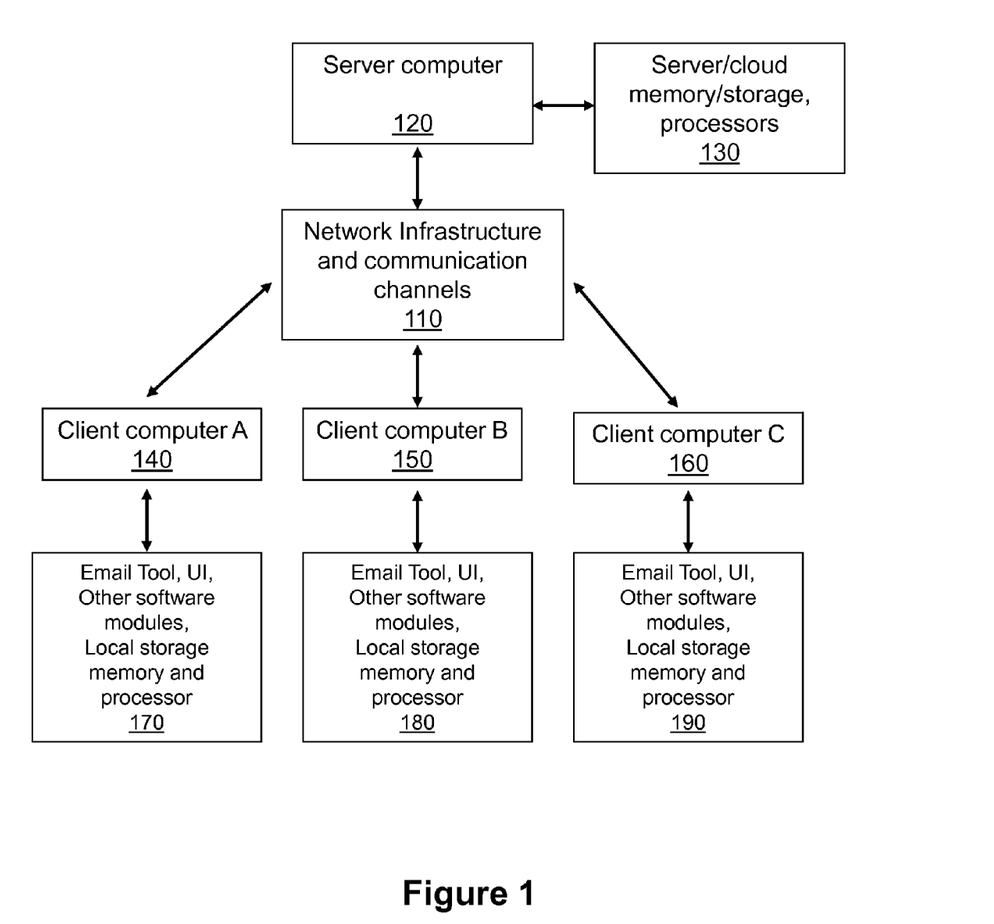
FIG. 1 is a system diagram illustrating a computer network system where the electronic communications such as emails are carried out and the present invention are implemented.

FIG. 1 is a diagram illustrating a system in the form of a computer network comprising servers, client computers, and related components, where the electronic communications such as emails are carried out and where the present invention is implemented.

In FIG. 1, client computing devices (140), (150), and (160), etc., are connected with each other and with an email server (120) through a network infrastructure and communication channels (110). The server computing device (120) is equipped with its own processors and memory, and local or cloud-based storage media (130), as well as messaging server software. The client computing devices can have their own local storage, as well as memory and processors, coupled with various software modules including email tools, user interface, and text analysis software modules (170), (180), and (190), etc. Text-based message communications such as emails can be sent and received by the client computers and displayed in the user interface for composing and viewing. Users of the client computing devices can act on the objects in the user interfaces displayed on the client computing device to compose and send emails to either a single recipient, or to multiple recipients.

As the present invention focus on solutions involving messages sent or received by multiple recipients, in the following description, for ease of illustration, the original message sent to multiple recipients may be referred to as email A, and the sender who sends email A to multiple recipients may be referred to as person A.

A recipient of email A may compose another email as a reply to email A. Also for ease of illustration, the reply message may be referred to as email B, and the sender who receives and replies to email A may be referred to as person B.

In addition to person B, as email A is sent to multiple recipients, a recipient of email A other than person A or B may be referred to as person C.

For replying to a multiple-recipient email, email tools currently in the market usually provide user interface objects such as a button or dropdown list to allow person B to choose whether to reply to person A only, or reply to all recipients. If person B selects to reply to the sender only, only the sender's address will be automatically populated in the "To:" field; and if person B selects to reply to all recipients, then addresses of all the recipients will be automatically populated in the "To:" field.

The present invention provides system, methods, and user interface for enhanced functionality with message systems of various types, to reduce confusion and avoid mistakes in electronic communications involving multiple participants.

Figure 2:
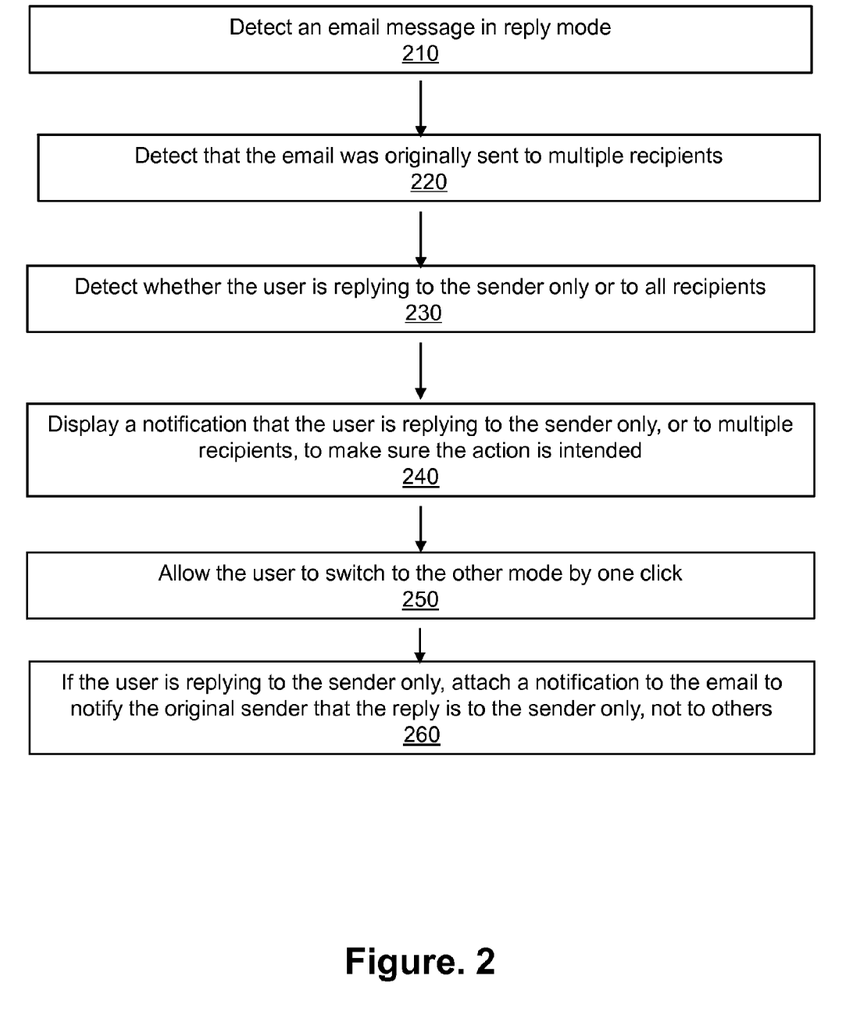
FIG. 2 is a flowchart illustrating the exemplar steps of the methods of the present invention.

FIG. 2 is a flowchart illustrating the exemplar steps of the methods of the present invention.

In the present invention, when a user starts to reply to an email from a computing device such as shown in (140), (150), and (160), say, email A, an email composing window is detected (210). The system further detects whether the email is originally sent to multiple recipients or not. If the email is originally sent to multiple recipients (220), the system further detects whether the user has acted on a user interface object such as a button designated for replying to sender only or replying to all recipients (230).

If the user is replying to the sender only, a notification that the user is replying to the sender only is displayed in a user interface connected with the computing device, as a reminder for the user to make sure that the user intentionally does not want to reply to other recipients of email A (240). If the user is replying to all recipients of email A, a notification that the user is replying to all recipients is displayed, as a reminder for the user to make sure that the user intentionally does want to reply to all recipients of email A, or his reply does not contain information that is intended for the sender only (240).

The present system further provides user interface objects such as additional buttons to enable the user to easily switch the reply mode by one click or one touch, if the user realizes that the current reply mode (either to the sender only or to all recipients) is not the intended action (250).

Furthermore, if the user is replying to the sender only for a message that is originally addressed to multiple recipients, the present system can attach a notification to the email to notify the original sender that this reply is to the sender only, or person A only, but not to others. This way, person A can be aware of the fact that the message is addressed only to him, and can take appropriate actions such as either to forward the message to other recipients, or to keep the message to himself if the message contains private information intended for person A only (250).

The following are more detailed descriptions of various use cases when the present invention can be implemented.

In one embodiment, person B selects the action of replying to person A only. As described above, the system detects that email A was addressed to multiple recipients, thus there is a possibility that person B may have selected to reply to person A only by mistake or by accident due to a habit of acting on the first available button in the conventional user interface. In such a case, the system of the present invention displays a notification to notify or remind person B that he or she is replying to person A only for an email that is addressed to multiple recipients.

The notification can be a text message, which can disappear when the user starts to type in the composing window, or a sound, or a vibration, or a color code or other highlighting methods, etc.

The notification can also be in the form of displaying or highlighting a user interface object that can suggest the other choice of reply. For example, when the user is in the reply-to-all-recipients mode, the system can automatically highlight the address of another recipient who is not the sender, or highlight the address of the sender to show the difference in the two types of addresses, or when the user is in the reply-to-sender-only mode, the system can automatically suggest to add multiple recipients when the system detects that email A is addressed to multiple recipients.

Figure 3:
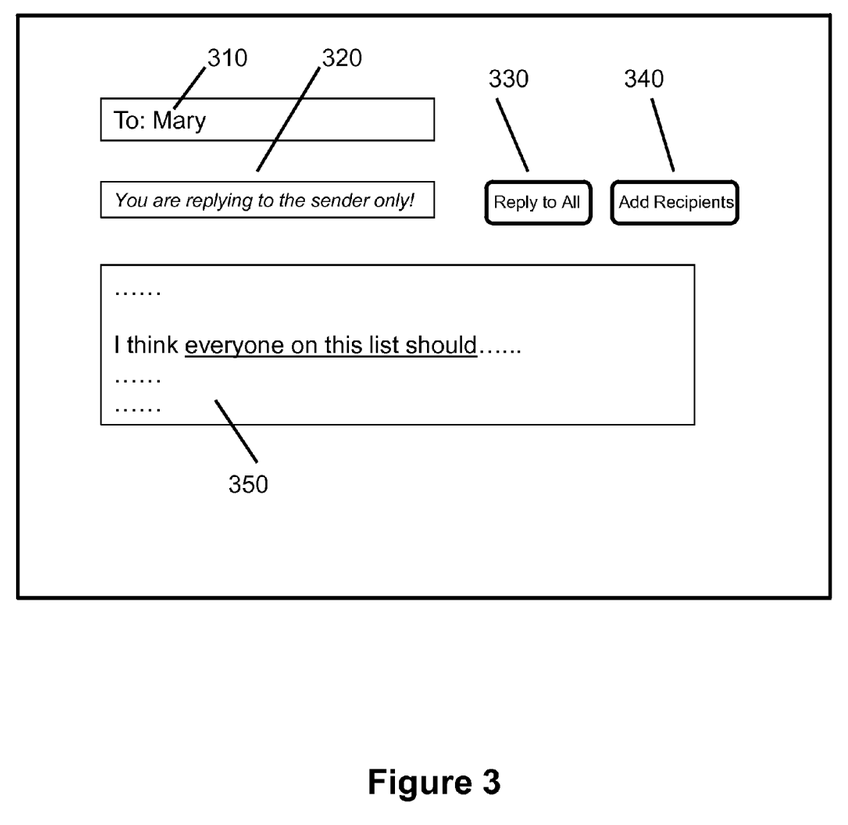
FIG. 3 is an exemplar user interface illustrating the notification as a text message when the user is replying to sender only for an email that is addressed to multiple recipients.

FIG. 3 is an exemplar user interface of the present invention, illustrating the notification as a text message when the system detects that person B is replying to person A only for an email that is addressed to multiple recipients. In FIG. 3, the "To:" field (310) is automatically populated with person A's address based on person B's selection. A notification (320) is displayed as a text message.

In some embodiments, when person B has typed in enough text content (350) in the reply, a text analysis tool can be automatically invoked to check if the content contains words or phrases that can indicate that the reply should be sent to multiple recipients. For example, the message text in (350), such as "Hi all", or "everyone on this list . . . " etc., can be interpreted as clues that the reply message should be addressed to multiple or all recipients of email A.

The text analysis tool can use various methods for detecting hints or clues in the message text for this purpose. For example, a list of words that are semantically referring to multiple persons such as "all", "all of", "everyone", etc., can be pre-compiled either manually or automatically, and words or phrases in the user-typed-in text can be matched with the words or phrases in the list. Depending on the results of matching the words or phrases in the message text and on the list, the system can make a decision whether to display the notification or not. This way, the email system can become much more intelligent than it is currently.

In some embodiments, additional user interface objects, such as the buttons (330) and (340) as illustrated in FIG. 3, can be displayed to the user when the system detects that person B is replying to person A only. Such objects can be displayed at a place close to where the user starts to enter text, such as at the beginning part of the composing window, so that they are easily visible. In addition to convenience, such objects, especially when easily visible when composing the reply or sending the message, can also function as a special type of the notification described above. For example, the presence of such button, especially the labels of the buttons, such as "Reply to All", "Add Recipients", etc., have new uses of implying that the current mode of operation is in replying to the sender only, when such objects or text labels are displayed in the context of person B replying to person A only. Conventional email tools may display similar buttons for general functions, but not selectively displayed in the context of a specific operation mode.

In some embodiments, even when both options of "reply to sender only" and "reply to all recipients" are displayed in a non-specific context such as in the conventional email tools, in the present invention, before the user makes a selection that launches the composing window, when the system detects that email A is addressed to multiple recipients, the user interface object for the "reply to all recipients" option can be highlighted with a visual effect as a form of notification to the user that the message is addressed to multiple recipients, such that the user may select the appropriate way to reply, either to the sender only, or to the all recipients.

In some embodiments, with the presence of the objects illustrated by (330) and (340), the text notification (320) may be omitted, as the function of notifying person B that the reply is addressed to person A only can be performed by the mere presence of such objects or their text labels.

In some embodiments, the notification can be displayed either before or after the user performs the "Send" action.

In addition to providing the notification for the purpose of reducing the confusion or avoiding accidental mistakes when replying to an emailed originally sent to multiple recipients, the contextually displayed user interface objects (330) and (340) of the present invention can further provide added convenience to the user for enhanced productivity as described below.

For replying to a multiple-recipient email, email tools currently in the market usually provide user interface objects such as a button or dropdown list to allow person B to choose whether to reply to person A only, or reply to All recipients. If the user selects to reply to the sender only, only the sender's address will be automatically populated in the "To:" field; and if the user selects to reply to all recipients, then addresses of all the recipients will be automatically populated in the "To:" field.

With the conventional methods, if person B selects to reply to person A only, and compose the message, then realizes that the reply should be sent to all recipients, then person B needs to manually add the remaining recipients one by one, or go out of the composing window to make the change, which is a time-consuming process, especially when the composing window is located at a place far away from where the user can make the change. Likewise, if person B starts to reply to all recipients, and then realizes that the message content is intended or appropriate for the sender or person A only, then person B needs to remove the addresses of other recipients one by one, which is also a time-consuming process.

The present invention further provides solutions to such problem by providing user interface objects to allow the user to switch the selection from reply to sender only to reply to all, or vice versa, by one click or touch in the same composing window, at the same time when such objects can function as contextual notifications as described above.

In some embodiments, the system of the present invention detects that person B is replying to person A only, and in such a case the system displays a user interface object (330) such as a button or icon in close proximity to the "To:" field, or within the composing window for easy access, such that if person B wants to change to reply to all recipients, person B does not need to manually add the rest of the recipients to the "To:" field, but just acts on the user interface object and the system can automatically populate the "To:" or "cc:" field with the remaining recipients' addresses, as appropriate.

In some other embodiments, another user interface object (340) can be provided to allow person B to select one or more recipients of email A, without having to manually type the address in the "To:" or "cc:" field.

The system, methods and user interface as illustrated above with the use case of person B selecting to reply to person A only for the multiple-recipient email A can readily be applied to the use case when person B first selects to reply to all recipients.

Figure 4:
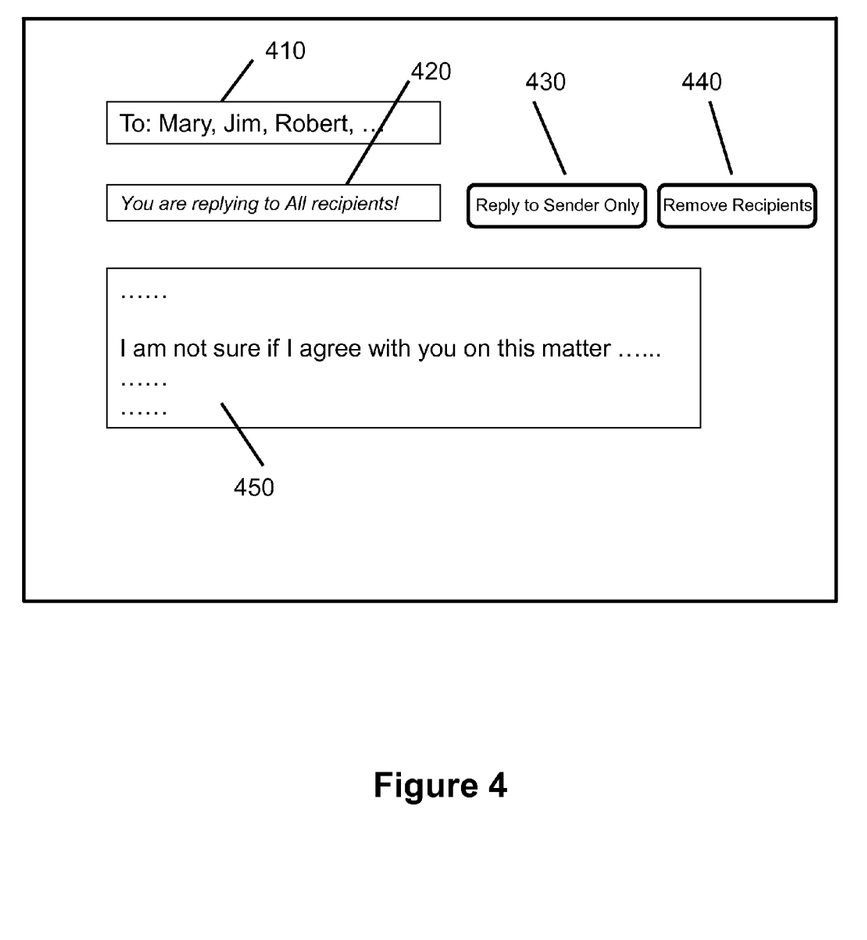
FIG. 4 is an exemplar user interface illustrating the notification as a text message when the user is replying to all recipients.

FIG. 4 is an illustration of the corresponding methods and objects to the above use cases illustrated in FIG. 3. In FIG. 4, a notification (420) is displayed when the system detects that person B is replying to all recipients, to remind person B whether he or she actually intends to reply to person A only. Furthermore, contextually relevant objects such as buttons (430) and (440) are provided in the context that person B is replying to all recipients, to function both as a notification of the current operation mode, and a productivity tool when person B decides to change to reply to person A only.

Similarly, text analysis methods can be used to determine whether to display the notification (420) or the buttons (430) and (440) based on the linguistic clues from the words or phrases used in the content of the message.

In some embodiments, person B may intentionally reply to person A only, especially when the message contains content that is intended for or appropriate or private to person A only. In such a case, person A, as the sender of email A that is addressed to multiple recipients, may expect the reply from person B to be addressed also to multiple recipients, or may accidentally forward the message to other recipients. To avoid such mistakes, the present invention further provides a method to attach the notification to the reply email if person B replies to person A only. The notification can alert person A that this reply is addressed to him/her only, with the possibilities of either person B accidentally having replied to person A only, or the message contains private information to person A only, allowing person A to be aware of such cases.

With such a notification, person A can decide whether to forward the message to other recipients to keep all the original recipients informed if the message does not contain private information, or to keep the message to himself as a private message. This way, possible mistakes in the communication can be avoided.

Figure 5:
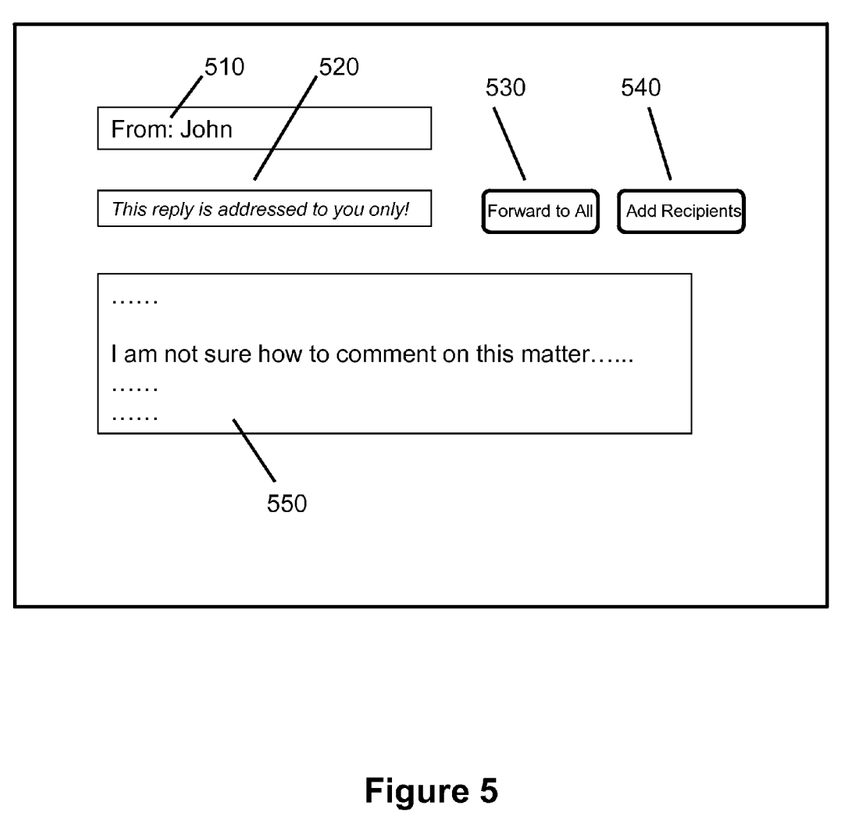
FIG. 5 is an exemplar user interface illustrating the notification attached to the email.

FIG. 5 is an illustration of the user interface of the present invention. In FIG. 5, the notification (530) is displayed to person A when the reply to the multiple-recipient email A is addressed to person A only, together with other interface objects (530) (540) for convenience and productivity, and as contextually relevant forms of notification that the reply is to the sender only, as described above with (330), (340), (430), and (440). As illustrated in FIG. 5, the user can forward this reply to other recipients in email A, either to all of the recipients by acting on button (530), or select individual recipients by acting on button (540).

Managing Confidential Information in Forwarded Emails

In the following description, for ease of illustration, an email thread comprising multiple email messages from at least two persons can be referred to as email E. One person in the thread can be referred to as person F, and another person in the thread can be referred to as person G. A third person, to whom the email is forwarded to, can be referred to as person H.

A thread contains both the personal information such as person F or G's name or email address. Furthermore, contents in the email communications between person F and G may contain confidential or private information. There are times when a person needs to forward a thread to a third person. In such a case, it is possible for either person F or G to accidentally forward a thread that contains confidential information. To avoid such accidents, the present invention provides system, methods, and user interface objects to display notifications or warnings when a person is forwarding a thread to a third person, especially when the third person is not in the thread.

The system first detects that the user F or G is forwarding email E to person H. Upon detection, the system displays a notification that the email E may contain confidential or private information not intended for other persons.

The notification can be a text message, or a sound, or a vibration, or a color code or other highlighting methods, etc.

Figure 6:
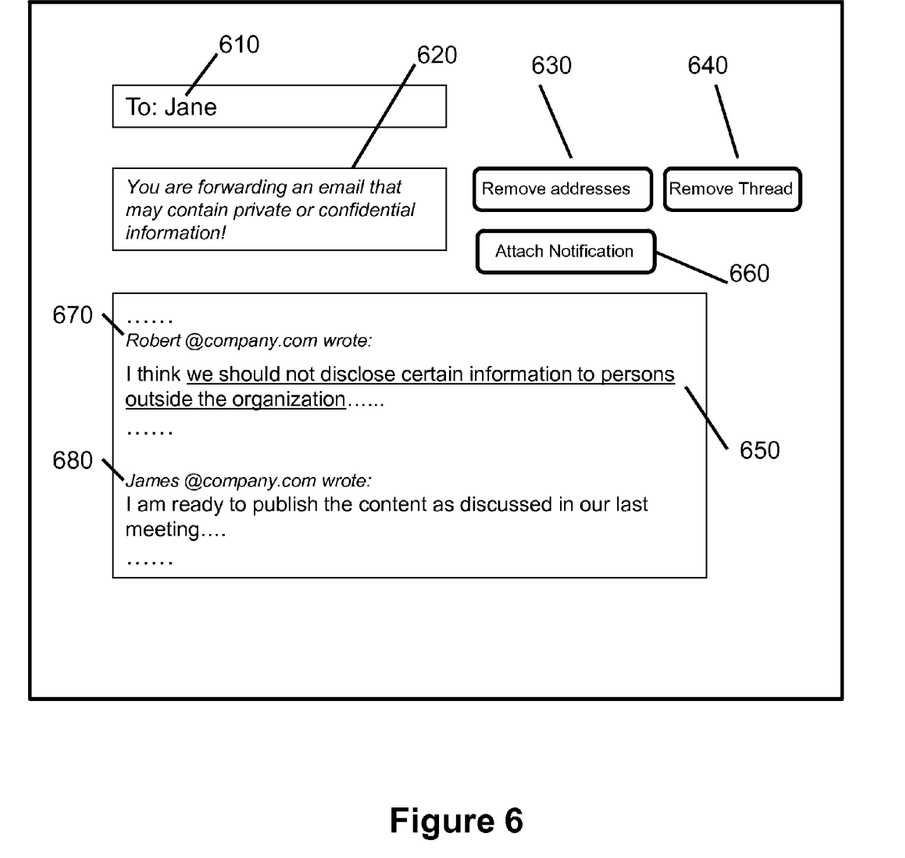
FIG. 6 is an exemplar user interface illustrating the notification when the user is forwarding an email thread.

FIG. 6 illustrates an exemplar user interface and functions of the present invention. In FIG. 6, when the system detects that person F is forwarding email E to person H, a notification (620) is displayed as a text message.

In some embodiments, additional user interface objects, such as illustrated in FIG. 6 by the buttons of (630), (640), and (660), can be displayed when the system detects that person F is forwarding email E to person H.

Button (630), when acted on, can invoke a software module that can identify the message headers in the thread, such as the personal information of senders including names or email addresses (670), (680); and automatically remove the related text, such that, at least, the personal information is not accidentally forwarded to person H.

Button (640), when acted on, can invoke a software module that can identify the message contents in the thread, and automatically remove the content in the thread except the latest content, based on the assumption that the latest content in the thread is most likely the relevant information to be forwarded to a third person.

Button (660), when acted on, can attach a notification to the email being forwarded to notify the receiver, or person H in this case, that the email being forwarded to him or her may contain confidential information.

In addition to providing convenience, objects such as button (630), (640), and (660) can also function as a special type of the notification described above. For example, the presence of such buttons, especially the labels of the buttons, such as "Remove addresses", "Attach Notification", etc., have new uses of implying that the current mode of operation is forwarding an email thread to a third person, when such objects or text labels are displayed in the context of forwarding an email thread that may contain confidential information.

In some embodiments, with the presence of the objects illustrated by (630), (640), and (660), the text notification (620) may be omitted, as the function of notifying person F that an email thread is being forwarded to a third person can be performed by the mere presence of such objects or their text labels.

If person F acts on button (680) to attach a notification to the email being forwarded, the notification can be displayed when the receiver of the forwarded email, or person H in this case, opens the forwarded email.

Figure 7:
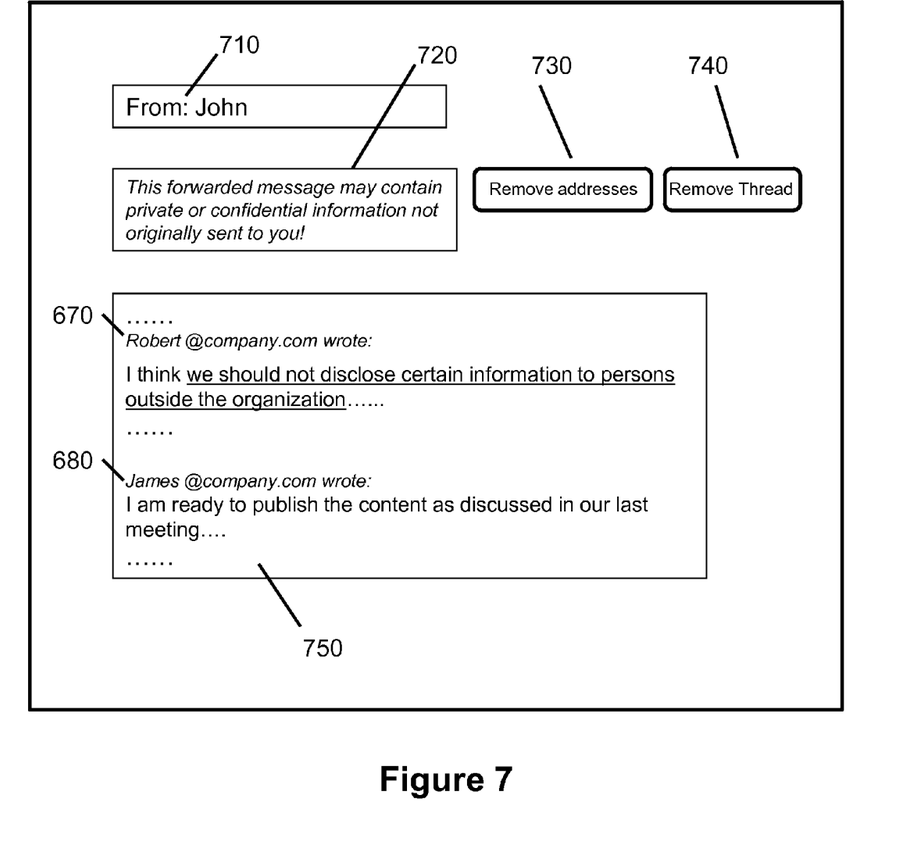
FIG. 7 is an exemplar user interface illustrating the notification when the receiver opens the forwarded email.

FIG. 7 illustrates an exemplar user interface of the present invention. In FIG. 7, notification (720) is displayed when the receiver opens the forwarded email. Additional user interface objects, such as buttons (730) and (740) can be displayed when the system detects that the email is a forwarded thread containing previous communications.

When the receiver acts on button (730), a software code module can be invoked that can identify the message headers in the thread, such as the personal information of senders including names or email addresses (670), (680); and automatically remove the related text, such that, at least, the personal information is not kept by person H, even if person H has seen it.

When the receiver acts on button (740), a software code module can be invoked that can identify the message contents in the thread, and automatically remove the contents in the thread except the latest content, based on the assumption that the latest content in the thread is most likely the relevant information to be forwarded to a third person.

In some embodiments, the system can determine whether to display the notification or the related buttons described above based on the results of a text content analysis. A text analysis tool can be automatically invoked to check if the content contains words or phrases that can indicate that the content is confidential. For example, the message text in (650), such as "not disclose certain information . . . " etc., can be interpreted as clues that a notification can be displayed.

The text analysis tool can use various methods for detecting hints or clues in the message text for this purpose. For example, a list of words that are semantically referring to private or confidential information, such as "private", "confidential", etc., can be pre-compiled either manually or automatically, and words or phrases in the message text can be matched with the words or phrases in the list. Depending on the results of matching the words or phrases in the message text and on the list, the system can make a decision whether to display the notification or not. This way, the email system can become much more intelligent than it is currently.

In some other embodiments, the system can determine whether to display the notification or not based on the comparison of the recipient list in the email thread being forwarded and the address of the person being forwarded to, such as person H in this case. If person H's address is in one of the emails in the thread, then the system can decide not to display the notification since the person may have been accidentally dropped in the thread and the current forwarding of the thread is to add him or her back to the thread.

The above are only examples for illustrating the system, methods, and user interface of the present invention. The applications of the present invention are not limited to the examples described above. The presently disclosed system and methods and user interface can also be applied to other similar environments without deviating from the spirit of the principles and the methods described above.

What is claimed is:

1. A computer-implemented method for managing message communications, comprising:
    receiving, by a computing device, a first message, wherein the first message is addressed to or received by multiple recipients, wherein the first message includes an email, a chat, SMS, or other message communication formats;
    registering, by the computing device, a user action to reply to the first message;
    creating and displaying in a user interface, by the computing device, a message composition or editing interface in response to the user action;
    distinguishing at least two operation modes of replying to a multi-recipient message, wherein the two operation modes comprises a first operation mode and a second operation mode, wherein the first operation mode comprises a reply only to the sender of the multi-recipient message, and the second operation mode comprises a reply to multiple recipients of the multi-recipient message;
    detecting, by the computing device, whether the user is replying only to the sender of the first message as in the first operation mode, or to multiple recipients of the first message as in the second operation mode; and
    displaying, by the computing device, a notification, wherein the notification indicates whether the user is replying in the first operation mode or in the second operation mode.

2. The method of claim 1, wherein it is detected that the user is replying only to the sender of the first message, or is replying in the first operation mode, wherein the notification indicates that the message being composed will not be sent to multiple recipients of the first message, or will be sent to the sender of the first message only.

3. The method of claim 1, wherein it is detected that the user is replying to multiple recipients of the first message, or is replying in the second operation mode, wherein the notification indicates that the message being composed will be sent to multiple recipients of the first message, or will be sent to a recipient that is not the original sender of the first message, or will not be sent only to the sender of the first message.

4. The method of claim 1, further comprising:
    attaching or allowing to attach, by the computing device, a notification to the message being composed if the user is replying only to the sender of the first message, wherein the notification indicates that the current reply is addressed to the sender only, or the current reply is not addressed to multiple recipients of the first message.

5. The method of claim 1, wherein a format of displaying the notification comprises a textual message, an icon, a sound, or a vibration, or a color code, or a highlighting method that distinguishes the first operation mode from the second operation mode, or a user interface object that allows the user to change the current operation mode without leaving the current composing window, or bears a label that reminds the user of the context of the current operation mode, or attaches a notification to the message to indicate the current operation mode based on user indication.

6. The method of claim 2, further comprising:
    providing a user interface object, wherein the user interface object allows the user to change to reply to multiple recipients of the first message by acting on the user interface object, or to automatically populate the recipient list with the multiple recipients of the first message, or allows the user to select a recipient from a list based on the recipients of the first message.

7. The method of claim 6, wherein the user interface object is a button or icon or a dropdown menu, wherein the user action is a click or a touch on the button or icon or menu.

8. The method of claim 3, further comprising:
    providing a user interface object, wherein the user interface object allows the user to change to reply to only the sender of the first message by acting on the user interface object, or to automatically remove the multiple recipients of the first message from the recipient list.

9. The method of claim 8, wherein the user interface object is a button or icon, wherein the user action is a click or a touch on the button or icon.

10. The method of claim 1, wherein the text in the first message contains words or phrases representing information about desired recipients including whether the reply should be sent to the original sender only, or to multiple recipients, the method further comprising:
    performing a text analysis on the text in the first message to detect information about desired recipients; and
    determining whether to display the notification based on the analysis result.

11. The method of claim 1, wherein the notification is displayed before or after the user performs the "Send" action.

12. A computer system for managing message communications, comprising:
    a storage media configured to store message objects including emails, chats, SMS, and other type of messages and software modules;
    a user interface configured to display message contents, and information about message senders or recipients; and
    one or more processors configured to access a memory module and the storage media, coupled with the user interface, and further configured to invoke a software module on a server or client computing device to
    (a) receive a first message, wherein the first message is addressed to or received by multiple recipients,
    (b) register a user action to reply to the first message,
    (c) display an message composition or editing interface in response to the user action,
    (d) detect whether the user is replying only to the sender of the first message as a first operation mode, or to multiple recipients of the first message as a second operation mode, and
    (e) display a notification, wherein the notification indicates whether the user is replying in the first operation mode or in the second operation mode.

13. The system of claim 12, wherein it is detected that the user is replying only to the sender of the first message, or is replying in the first operation mode, wherein the notification notifies the user that the message being composed will not be sent to multiple recipients of the first message, or will be sent to only the sender of the first message.

14. The system of claim 12, wherein it is detected that the user is replying to multiple recipients of the first message, or is replying in the second operation mode, wherein the notification indicates that the message being composed will be sent to multiple recipients of the first message, or will be sent to a recipient that is not the original sender of the first message, or will not be sent to only the sender of the first message.

15. The system of claim 12, wherein the processor is further configured to:
   attach or allow to attach a notification to the message being composed if the user is replying only to the sender of the first message, wherein the notification indicates that the current reply is sent to the sender only, or the current reply is not sent to multiple recipients of the first message.

16. The system of claim 12, wherein a format of displaying the notification comprises a textual message, an icon, a sound, or a vibration, or a color code or a highlighting method that distinguishes the first operation mode from the second operation mode, or a user interface object that allows the user to change the current operation mode without leaving the current composing window, or bears a label that reminds the user of the context of the current operation mode, or attaches a notification to the message to indicate the current operation mode based on user indication.

17. The system of claim 13, wherein the processor is further configured to:
   provide a user interface object, wherein the user interface object allows the user to change to reply to multiple recipients of the first message by acting on the user interface object, or to automatically populate the recipient list with multiple recipients of the first message, or allows the user to select a recipient from a list based on the recipients of the first message, wherein the user interface object is a button or icon or a dropdown menu, wherein the user action is a click or a touch on the button or icon or menu.

18. The system of claim 14, wherein the processor is further configured to:
   provide a user interface object, wherein the user interface object allows the user to change to reply to only the sender of the first message by acting on the user interface object, or to automatically remove multiple recipients of the first message from the recipient list, wherein the user interface object is a button or icon, wherein the user action is a click or a touch on the button or icon.

19. The system of claim 12, wherein the text in the first message contains words or phrases representing information about desired recipients including whether the reply should be sent to the original sender only, or to multiple recipients, wherein the processor is further configured to:
   perform a text analysis on the text in the first message to detect information about desired recipients, and
   determine whether to display the notification based on the analysis result.

20. A computer-implemented method for managing message communications, comprising:
   identifying, by a computing device, a user of a message system;
   receiving, by the computing device, a first message, wherein the first message is a reply to a previous message sent by the user, wherein the previous message is addressed to or received by multiple recipients;
   registering, by the computing device, an action from the user to view the first message;
   creating and displaying in a user interface, by the computing device, a message window in response to the user action;
   detecting, by the computing device, whether the first message is addressed to the user only, or to multiple recipients in the previous message;
   displaying, by the computing device, a user interface object if it is detected that the first message is addressed to the user only, wherein the user interface object functions at least as a suggestion for the user to forward the first message to one or more of the multiple recipients of the previous message;
   detecting a user indication to forward the first message; and
   upon detecting the user indication, forwarding the first message to one or more of the multiple recipients of the previous message, wherein the user interface object comprises a button or icon or a dropdown menu or a text.

* * * * *